United States Patent [19]

Harvey et al.

[11] Patent Number: 5,313,039
[45] Date of Patent: May 17, 1994

[54] SHIELDING GASES FOR ARC WELDING

[75] Inventors: Grant Harvey, Dorval; Jocelyn Turcot, Montreal; Jean-Pierre Larue, Outremont; Viwek V. Vaidya, Pointe Claire, all of Canada

[73] Assignee: Canadian Liquid Air Ltd./Air Liquide Canada Ltee., Montreal, Canada

[21] Appl. No.: 101,300

[22] Filed: Aug. 3, 1993

[30] Foreign Application Priority Data

Aug. 14, 1992 [CA] Canada ................................ 20762012

[51] Int. Cl.$^5$ ................................................ B23K 9/16
[52] U.S. Cl. ............................................................ 219/74
[58] Field of Search ................................ 219/74, 137 R

[56] References Cited

U.S. PATENT DOCUMENTS

| | | | |
|---|---|---|---|
| 3,496,323 | 2/1970 | Lesnewich et al. | 219/74 |
| 4,749,841 | 6/1988 | Galantino et al. | 219/74 |
| 4,857,692 | 8/1989 | Larson et al. | 219/74 |
| 4,871,898 | 10/1989 | Cherne et al. | 219/74 |
| 4,973,822 | 11/1990 | Evans et al. | 219/74 |
| 4,999,474 | 3/1991 | Schultz et al. | 219/74 |
| 5,083,002 | 1/1992 | Hoback et al. | 219/74 |

Primary Examiner—Clifford C. Shaw
Attorney, Agent, or Firm—Oblon, Spivak, McClelland, Maier & Neustadt

[57] ABSTRACT

A shielding gas for flux cored arc welding. The specific gas combination is intended to promote significantly lower fume emission levels while providing equivalent or better welding performance.

7 Claims, No Drawings

SHIELDING GASES FOR ARC WELDING

BACKGROUND OF THE INVENTION

1. Field of the Invention

The present invention involves flux cored arc welding and specifically to improved processing parameters resulting from the employment of specific shielding gas combinations. These combinations have been selected to significantly reduce fume emission levels while providing equivalent or better welding performance at normal operating parameters.

2. Description of the Background

Flux cored arc welding is a process that uses an arc between a continuous filler metal electrode and weld pool. The process is used with shielding from a flux contained within the tubular electrode, with or without additional shielding from an externally supplied gas, and without the application of pressure. Flux cored arc welding generally employs two major process variations for shielding the arc and weld pool from atmospheric contamination. A self-shielded embodiment protects the molten metal through the decomposition and vaporization of the flux core by the heat of the arc. The second embodiment involves a protective gas flow in addition to the flux core. With both embodiments, the electrode core material provides a substantial slag covering to protect the solidifying weld metal.

Typically, gas shielding requires a gas source, a pressure regulator, a flow metering device and necessary hoses and connectors. Shielding gases are dispensed from cylinders, manifolded cylinder groups or from bulk tanks which are piped to individual welding stations. Regulators and flow meters are used to control pressure and flow rates. Since regulators can freeze during rapid withdrawal of gas from storage tanks, heaters are available to prevent that complication. Welding grade gas purity is required because small amounts of moisture can result in porosity or hydrogen absorption in the weld metal. The dew point of shielding gases should be below −40° F. Suitable sources of such gases is shown in U.S. Pat. No. 4,973,822 dated Nov. 27, 1990, the disclosure of which is incorporated herein by reference.

Carbon dioxide is widely used as a shielding gas for flux cored arc welding. Two advantages of this gas are its low cost and deep weld penetration. It is also known to use gas mixtures such as the combination of an inert gas with carbon dioxide or oxygen. The "rule of thumb" is that the higher the percentage of inert gas in mixtures with carbon dioxide, the higher will be the transfer efficiencies of the deoxidizers contained in the core. The presence of an inert gas, such as argon, in sufficient quantities in a shielding gas mixture results in less oxidation than occurs with 100% carbon dioxide shielding.

The most common gas mixture for flux cored arc welding is 25% carbon dioxide and 75% argon (by volume). It has been observed that weld metal deposited with this mixture generally has higher tensile and yield strengths than weld metal deposited with 100% carbon dioxide shielding.

A good bit of attention has been directed toward the study and development of flux cored arc welding consumables which exhibit low fume emission rates. This is achieved by using flux components in the core of the wire that generate lower quantities of fumes upon degeneration in the welding arc. This research has produced consumables that have recently appeared on the market.

Little development work has been focused in the area of producing a shielding gas which provides decreased fume emission levels using all types of flux cored arc welding consumables. A shielding gas developed for process applications while promoting lower fume emission levels must also provide equivalent or better welding performance, at normal operating parameters, as compared to conventional flux cored arc welding shielding gases.

It is thus an object of the present invention to provide a shielding gas mixture that promotes significantly lower fume emission levels compared to that of commercially pure carbon dioxide and 75% argon/25% carbon dioxide mixtures as shielding gases while providing equivalent or better welding performance at normal operating parameters.

This and further objects will be more readily apparent when viewing the following disclosure and appended claims.

SUMMARY OF THE INVENTION

The present invention relates to a method for flux cored arc welding with a consumable flux cored wire electrode. The method comprises forming an arc between the consumable flux cored wire electrode and a workpiece while maintaining an arc voltage between the flux cored wire electrode and workpiece. Metal is transferred from the electrode to the workpiece while shielding the arc with a gas mixture. The improvement over prior art processes comprises providing as the gas mixture approximately 5–15% by volume helium, approximately 5–25% by volume carbon dioxide and the remainder argon.

DETAILED DESCRIPTION OF THE PREFERRED EMBODIMENTS

U.S. Pat. No. 4,973,822 generally describes apparatus useful in flux cored arc welding. Generally, a consumable flux cored wire electrode is fed from a reel through a tube located in a gas shielded arc welding torch. The torch may be either manually operated or mechanized. Uniformly, the feed roll is driven by a drive motor which feeds the wire at speeds necessary to achieve the desired deposition rates.

An arc is established between the consumable flux cored electrode and workpiece by an energizing power supply feeding the electrode into direct contact with the workpiece. The arc voltage between the electrode and workpiece is kept substantially constant during the welding process. As previously noted, the consumable electrode is fed through a contact tube into an arc formed between the electrode and workpiece.

The arc is shielded from the ambient atmosphere by a gas mixture. Common shielding gases previously employed consist of pure carbon dioxide as well as mixtures of 75% argon and 25% carbon dioxide.

Commercially pure carbon dioxide is a popular gas used in flux cored arc welding systems in view of its inexpensive price and deep penetration characteristics. However, commercially pure carbon dioxide tends to cause excessive spatter and large fume emission levels. The 75% argon/25% carbon dioxide mixture used as an alternative to commercially pure carbon dioxide, promotes a more stable arc thus reducing spatter levels and is less oxidizing thereby producing lower fume emission levels, all while sacrificing little in the area of penetration.

It has been determined, however, that even lower fume emission levels in flux cored arc welding processes can be achieved by employing a specific combination of argon/carbon dioxide/helium shielding gases. This specific combination effectively lowers the oxidation level of the total mixture thus promoting lower fume emission levels while providing arc transfer and weld deposit characteristics that are equivalent or better than those obtained using commercially pure carbon dioxide or 75% argon/25% carbon dioxide shielding gas mixtures or gas mixtures containing intermediate quantities of carbon dioxide and argon. In fact, fume emission analysis has shown up to a 33% decrease in fume emission levels when testing the present shielding gas mixture against a 75% argon/25% carbon dioxide mixture while keeping all other welding parameters constant. Field tests and extensive laboratory testing using the present shielding gas mixture has proven that it will provide equivalent or better welding performance, improved weld bead appearance, reduced spatter levels and equivalent or improved weld deposit characteristics than would normally be obtained using either commercially pure carbon dioxide or a 75% argon/25% carbon dioxide shielding gas mixture.

The present shielding gas combination comprises a gas mixture of approximately 5-15% by volume helium, approximately 5-25% by volume carbon dioxide and the remainder argon. More preferably, the gas mixture comprises approximately 5-15% by volume helium, approximately 10-20% by volume carbon dioxide and the balance argon. Most preferably, the gas mixture comprises approximately 9-11% by volume helium, approximately 14-16% by volume carbon dioxide and the balance argon.

The present invention will now be further illustrated by reference to certain Examples which are provided solely for purposes of illustration and are not intended to be limitative.

EXPERIMENTAL

A flux cored arc welding system was established having the following welding parameters:

| Voltage | 25 |
|---|---|
| Amperage | 225 |
| Wire feed speed | 200 in./min. |
| Position | Flat |
| Gas flow rate | 40 ft$^3$/hr. |
| Wire diameter | 1/16 inch |

Fume testing was performed in accordance with AWS F1.2-79. Measure values of % fume per unit weight of consumable is indicated below having been normalized to compare the relative amount of fumes generated in relation to what is observed using 100% carbon dioxide with each particular wire.

| | Normalized Values V. Carbon Dioxide | | |
|---|---|---|---|
| | 100% CO$_2$ | 75% Ar/25% CO$_2$ | 75% Ar/ 15% CO$_2$ 10% He |
| Mild Steel Wires | | | |
| Tri-Mark TM-772 | 1.00 | 0.98 | 0.75 |
| Lincoln Outershield 71 | 1.00 | 0.92 | 0.73 |
| L.C.C. RDT 55 | 1.00 | 0.89 | 0.81 |
| Hobart 802 | 1.00 | 0.91 | 0.86 |
| C.L.A. T-91 | 1.00 | 0.81 | 0.67 |
| L.C.C. LC-75 | 1.00 | 1.00 | 0.86 |
| C.L.A. T-9 | 1.00 | 0.99 | 0.80 |
| Stainless Steel Wires | | | |
| Kobe 309L | 1.00 | 0.76 | 0.72 |
| A.R. Shieldbright 309L | 1.00 | 0.81 | 0.70 |

Once the percent fume per unit weight of consumable was determined using carbon dioxide, the 75% argon/25% carbon dioxide mixture and the gas mixture provided pursuant to the present invention, fume emission rates were then normalized versus carbon dioxide by dividing the measured value by the value obtained using 100% carbon dioxide. For example, in dealing with the Tri-Mark TM-772 wire, fume emission rate using the 75% argon/25% carbon dioxide mixture was only 0.98 times that using 100% carbon dioxide. This indicates that the use of a 75% argon/25% carbon dioxide shielding gas mixture provided a 2% decrease in the quantity of fume. The gas mixture of the present invention gave a 25% decrease (1.00 minus 0.75) in the quantity of fume when using such wire.

As a benchmark, is operating within the present invention, it was a design parameter that welding performance be as good as better than that of a 75% argon/25% carbon dioxide mixture which is considered the standard of "welding performance" for flux cored arc welding. Welding performance incorporates aspects of arc stability, spatter level, penetration, weld fluidity, wetability and overall operator appeal. Welding performance data is a quantitative result and, therefore, it represented a goal that appropriate shielding gas provide the best combination of reduced fume emission levels and welding performance. It was found that various mixtures combined outside of those levels constituting the present invention produced excessive quantities of fume, or, did not meet minimum requirements for "welding performance."

Fume emission results and/or welding performance results were then determined for compositions outside the present invention.

| Gas Mixture | Fume Results | Welding Performance |
|---|---|---|
| 75% Ar/25% He | 52% less | Poor Unstable arc Weld puddle too fluid |
| 75% Ar/15% He/10% CO$_2$ | 14% less | Acceptable Poor welding performance noted particularly when welding in the vertical orientation where weld puddle was excessively fluid. |

The above testing concluded that any decrease in the quantity of carbon dioxide in the gas mixture will result in reduced fume emission levels, if the carbon dioxide is replaced by an inert gas such as argon or helium. As the carbon dioxide percentage is decreased though, the welding performance, in particular, the penetration and wetability decreased to an unacceptable level. Replacement of the displaced carbon dioxide with helium gave optimum welding performance at a quantity of 10% and provided substantially reduced fume emission levels. A 15% helium level which is the upper helium percent level of the present invention provided more reduction in fume emission but proved to have reduced "welding performance" as compared to the 10% helium level. As noted from the table above, the gas mixture of 75% Ar/15% He/10% $CO_2$ provided acceptable welding characteristics versus 75% Ar/25% $CO_2$ but was determined to have poorer welding performance characteristics when compared to the composition of 75% Ar/15% $CO_2$/10% He. The poorer welding performance was particularly noticeable when welding in the vertical position in which case the increased He content caused the weld puddle to become a bit too fluid. It was determined that He content between 10-15% provides acceptable welding performance in a flat or horizontal orientation but not in the vertical orientation.

Having described the present invention, it will be apparent that many changes and modifications may be made to the above-described embodiments without departing from the spirit and the scope of the present invention.

We claim:

1. A method for gas metal arc welding with a consumable wire electrode, comprising:
   (a) forming an arc between the consumable wire electrode and a workpiece;
   (b) maintaining an arc voltage between said flux cored wire electrode and workpiece;
   (c) transferring metal from the electrode to the workpiece; and
   (d) shielding the arc with a gas mixture; the improvement comprising providing as said gas mixture approximately 5-15% by volume helium approximately 5-25% by volume carbon dioxide and the remainder argon.

2. A method for flux cored arc welding with a consumable flux cored wire electrode, comprising:
   (a) forming an arc between the consumable wire electrode and a workpiece;
   (b) maintaining an arc voltage between said flux cored wire electrode and workpiece;
   (c) transferring metal from the electrode to the workpiece; and
   (d) shielding the arc with a gas mixture; the improvement comprising providing as said gas mixture approximately 5-15% by volume helium approximately 5-25% by volume carbon dioxide and the remainder argon.

3. The method according to claim 2, wherein said gas mixture comprises approximately 5-15% by volume helium, approximately 10-20% by volume carbon dioxide and the balance argon.

4. The method according to claim 2, wherein said gas mixture comprises approximately 9-11% by volume helium, approximately 14-16% by volume carbon dioxide and the balance argon.

5. The method according to claim 2, wherein said gas mixture comprises approximately 5-15% by volume helium, approximately 10-20% by volume carbon dioxide and the balance argon wherein said workpiece is maintained in a substantially horizontal orientation while transferring said metal from said electrode to said workpiece.

6. A shielding gas for flux cored arc welding with a consumable flux cored wire electrode comprising a gas mixture of approximately 5-15% by volume helium, approximately 5-25% by volume carbon dioxide and approximately 60-90% by volume argon.

7. The shielding gas according to claim 6, comprising approximately 75% argon and the remainder being a mixture of carbon dioxide and helium.

* * * * *